(12) United States Patent  
Burnette (10) Patent No.: US 8,774,018 B1  
(45) Date of Patent: Jul. 8, 2014

(54) INTERACTIVE INQUIRY AND ACCESS TO INFORMATION VIA CELLULAR NETWORKS

(75) Inventor: Mickey Burnette, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1690 days.

(21) Appl. No.: 11/611,020

(22) Filed: Dec. 14, 2006

(51) Int. Cl.
*H04L 12/26* (2006.01)
*H04N 7/173* (2011.01)
*H04L 12/54* (2013.01)

(52) U.S. Cl.
CPC .............. *H04N 7/173* (2013.01); *H04L 12/56* (2013.01)
USPC ........................................................ 370/252

(58) Field of Classification Search
CPC .................................................... H04N 7/173
USPC ............ 370/252, 265, 432, 480, 486; 725/34, 725/39, 50, 51, 80, 100, 131
See application file for complete search history.

(56) References Cited

U.S. PATENT DOCUMENTS

| | | | | |
|---|---|---|---|---|
| 6,940,813 B2 * | 9/2005 | Ruutu | | 370/231 |
| 7,100,187 B2 * | 8/2006 | Pierzga et al. | | 725/76 |
| 2002/0056136 A1 * | 5/2002 | Wistendahl et al. | | 725/135 |
| 2002/0131428 A1 * | 9/2002 | Pecus et al. | | 370/401 |
| 2003/0107589 A1 * | 6/2003 | Liu | | 345/716 |
| 2006/0026647 A1 * | 2/2006 | Potrebic et al. | | 725/53 |
| 2006/0078122 A1 * | 4/2006 | Dacosta | | 380/258 |
| 2006/0184977 A1 * | 8/2006 | Mueller et al. | | 725/86 |
| 2007/0183407 A1 * | 8/2007 | Bennett et al. | | 370/352 |
| 2007/0250863 A1 * | 10/2007 | Ferguson | | 725/46 |
| 2008/0092158 A1 * | 4/2008 | Bhatnagar et al. | | 725/34 |

\* cited by examiner

*Primary Examiner* — Dang Ton
*Assistant Examiner* — Nourali Mansoury
(74) *Attorney, Agent, or Firm* — Parks IP Law LLC; Mickki D. Murray, Esq.

(57) ABSTRACT

Interactive inquiry and access to information via cellular networks is described. In an embodiment, a provided number entered via a device of a user to gain access to a network interface may be received, and the user may be enabled to enter a first queue. A broadcast may be transmitted by live or pre-recorded transmission via the network interface, and a specific entry that corresponds to a subject depicted in the transmission may be received. The receipt of the specific entry corresponding to a subject enables the user to enter a second queue containing topics of information related to the subject, and a selection for a desired topic of information and a media format preference for the delivery of that selected topic of information may be received. The receipt of the topic of information selection enables the user to enter a third queue where the selected topic of information may be delivered in the preferred media format.

20 Claims, 6 Drawing Sheets

Fig. 6

INTERACTIVE INQUIRY AND ACCESS TO INFORMATION VIA CELLULAR NETWORKS

BACKGROUND

Conventional service provider systems for cellular devices provide basic telephone calling abilities, text messaging, and internet connectivity, as well as typical telephone service options, such as call waiting, conference calling, caller ID, and voicemail services. A cellular phone user can utilize the service provider system to call a specified number for receipt of information, such as information about the weather, but the user inquiry ends with either an automated menu system for information delivery or an automated message delivery of the requested information. Typical service provider systems for cellular devices provide users with no interactive ability to inquire about specific information related to an attended event or location, to select areas or subjects of information of interest, or to receive requested information via the cellular device in a desired media format.

Additionally, typical conference bridging services do not provide users with interactive control of information or inquiry processes for acquiring additional information. Conventional conference bridging technologies enable cellular users to connect to a conference bridge, listen to and/or view other parties in the conversation, and supply vocal responses. Typically, a user of a cellular device is restricted to communication with other users and to limited information access with automated message responses.

SUMMARY

This summary is provided to introduce features and concepts of interactive inquiry and access to information via cellular networks, and is not intended for use in determining the scope of the claimed subject matter.

In an embodiment of interactive inquiry and access to information via cellular networks, a number entered via a device of a user to gain access to a network interface can be received, and the user can be enabled to enter a first queue. A broadcast can be transmitted by live or pre-recorded transmission via the network interface, and a specific entry that corresponds to a subject depicted in the transmission can be received. The receipt of the specific entry enables the user to enter a second queue containing topics of information related to the subject, and a selection for a desired topic of information and a media format preference for the delivery of that selected topic of information can be received. The receipt of the topic of information selection enables the user to enter a third queue where the selected topic of information can be delivered to the user in the preferred media format.

In another embodiment of interactive inquiry and access to information via cellular networks, a network interface of a service provider system receives an access number entered via a device associated with a user. A multimedia server receives incoming live information pertaining to a plurality of different subjects, where the live information is separated into respective live streams pertaining to the different subjects by a live information segregation module. The multimedia server also receives information requests entered via the device once access to the service provider system is achieved. An information retriever engine accesses and delivers the requested live information to the device, and a geographic location association module associates the requested information with geographic location.

In another embodiment of interactive inquiry and access to information via cellular networks, a network interface of a service provider system receives an access number entered via a device associated with a user. A multimedia server receives information requests pertaining to a plurality of different subjects entered via the device, and a pre-recorded information segregation module organizes the database of pre-recorded information stored on the multimedia server into categories pertaining to the different subjects. An information retriever engine accesses and delivers the requested pre-recorded information to the device, and a geographic location association module associates the requested information with geographic location.

BRIEF DESCRIPTION OF THE DRAWINGS

The same numbers are used throughout the drawings to reference like features and components.

DETAILED DESCRIPTION

Interactive inquiry and access to information via cellular networks is described in which implementations provide for the use of devices for requesting and receiving detailed information related to one or more events attended by users, or related to one or more locations of the users. Users with applicable devices are enabled to access and receive information which is usually only available through alternate routes, such as live transmissions of sporting events, detailed information about commercial businesses, current and past statistics concerning weather, driving directions, road and traffic conditions, shopping mall store information, such as sales and detailed store information, community or county services, and emergency management services, such as fire or police two-way radio transmission broadcasts.

Interactive inquiry and access to information via cellular networks provides for the receipt of requests made for subjects related to an event or location attended by a user. Once a number for accessing the service provider has been received from the device of the user, an ability to enter subject requests via a device is provided. A service provider supplies an access number to users at events or at other participating locations, which is entered via the device and received by the service provider system via a network interface and simulcasting bridge. Access to the service provider system enables the user to begin inquiring about particular subjects relevant to the event or location attended.

Interactive inquiry and access to information via cellular networks provides a user with an interactive ability to inquire about detailed information relevant to an event or locale and to receive the information of interest in a range of media formats directly to the device in use or to an alternate computing device. The service provider system supplying the interactive inquiry and access service utilizes a nested queue system, where a user request for a particular subject by device entry enables the user to enter a next queue. This next queue offers more options of even more detailed information, or topics, about the originally selected subject, and an option for the user to choose the media format for delivery of the selected topic. Selection of a topic and media format for delivery via a device enables the user to enter a next queue, where the selected topic of information is delivered to the device or to an alternate computing device. The overall result is the supply of specific information in multiple media formats to a private device or privately accessible data retrieval system (i.e., computing device or remote printer) based upon user interest.

While features and concepts of the described systems and methods for interactive inquiry and access to information via cellular networks can be implemented in any number of different environments, systems, and computing-based systems, embodiments of interactive inquiry and access to information via cellular networks are described in the context of the following exemplary systems and environments.

Figure 1:
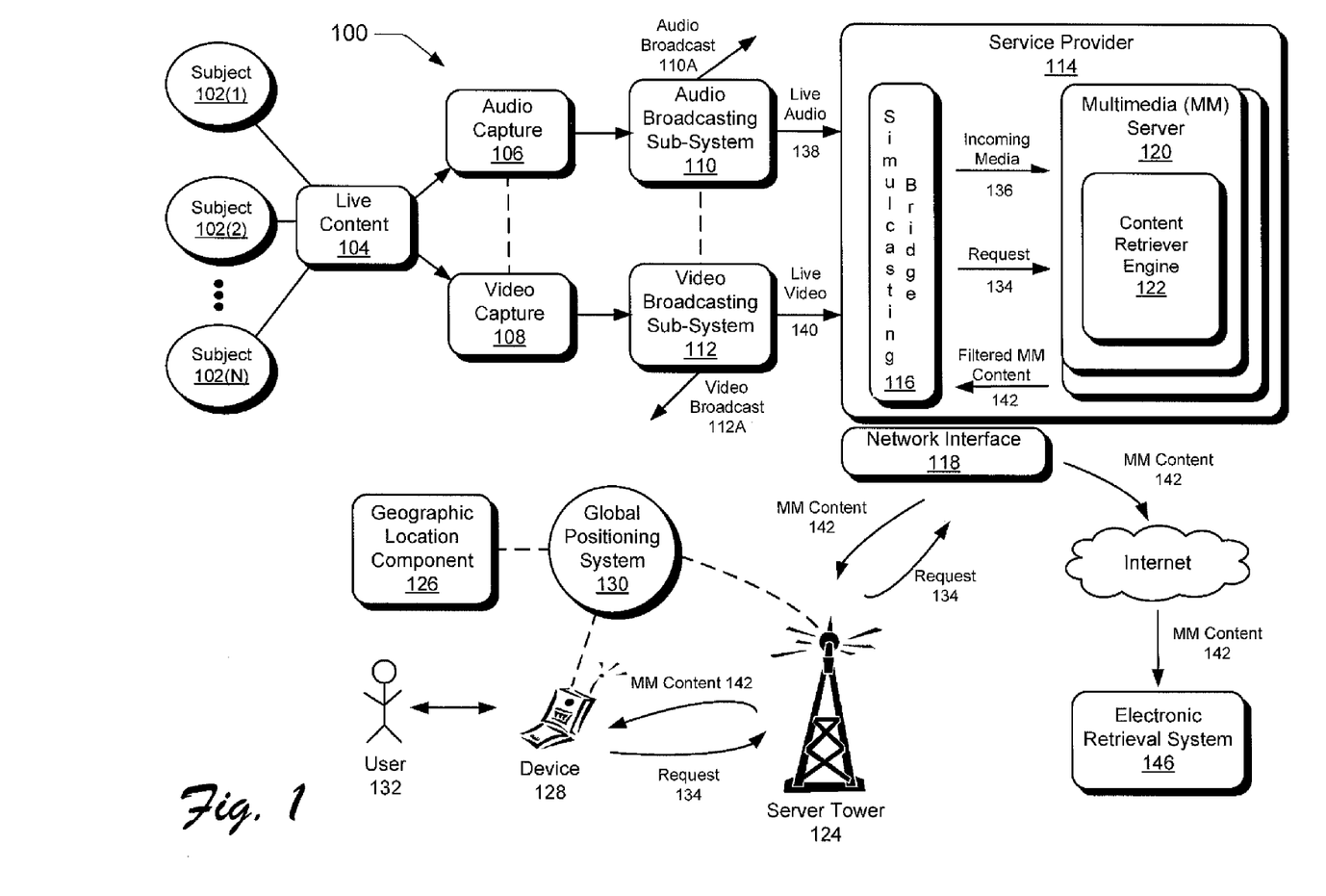
FIG. 1 is a block diagram illustrating an exemplary system in which embodiments of interactive inquiry and access to information via cellular networks can be implemented.

FIG. 1 illustrates an exemplary system 100 in which embodiments of interactive inquiry and access to information via cellular networks can be implemented. The illustrated configuration of the system 100 is only one example arrangement. Many arrangements of the illustrated components, or other similar components, are possible within the scope of the subject matter. The system 100 may operate with subject(s) 102, incoming live content 104, audio capture components 106, video capture components 108, audio broadcasting sub-system 110, and video broadcasting sub-system 112. The audio broadcasting sub-system 110 may provide an audio broadcast 110A (e.g., a radio transmission), and the video broadcasting sub-system 112 may provide a video broadcast 112A (e.g. a television broadcast or other visual content stream). The system may include a service provider system 114, a simulcasting bridge 116, a network interface 118, a multimedia server 120, a content retriever engine 122, a server tower 124 with geographic location component 126, an end-user device 128 with a global positioning system (GPS) 130, the internet 144, and an electronic retrieval system 146. A user 132 may interact with the system 100 using the device 128.

The system 100 enables users to request information specific to a particular location or event via, for example, the device 128 and the service provider system 114. Prior to providing information to the user, the system may enable the user to initially access the service provider system 114 by entering a specified access number via the device 128. The specified access number may be provided to the user of the device 128, and this access number may be one number used nationally which may relate to a particular location or event for which the user may request information. The access number can be determined by the service provider 114 or provider of the locale or event or site, or may be specified pursuant to an agreement between two or more involved entities. The access number can be made available as part of a service provider 114 subscription service, or on a fee-per-call basis for those users with devices 128 utilizing a subscription service other than the service provider 114 providing the access number and interactive inquiry service. Therefore, both subscribers to the service provider 114 and non-subscribers of the service provider 114 may utilize the system 100 providing interactive inquiry and access to information. It is thus understood that the user 132 may access the services provided by the service provider 114, whether or not the user 132 subscribes to the service provider 114. However, those users who subscribe to the service provider 114 may, in some instances, receive services under different (and possibly more favorable) terms than non-subscribers. Users who subscribe to the service provider 114 may preauthorize billing, select options, and configure desired parameters for the use of the system 100, through a variety of avenues, such as, for example, via internet access to a provisioning site of the service provider 114.

After the users access the service provider system 114, the system enables the users to request information pertaining to a plurality of subjects 102 relevant to a location or event. FIG. 1 represents these requests generally at 134. These requests 134 may include voice commands, or the entries of any number and combinations of letters, numbers, or any other characters supported by the device 128. The service provider system 114 may receive this request 134 via the simulcasting bridge 116 and the network interface 118.

The service provider system 114 may receive incoming media, represented generally at 136, from sources such as the audio broadcast sub-system 110 and/or the video broadcast sub-system 112. For example, the service provider system 114 may receive a live audio feed (e.g., a radio feed), which FIG. 1 denotes at 138. Further, the service provider system 114 may receive a live audio/video feed (e.g., a television feed), which FIG. 1 denotes at 140. Thus, the incoming media 136 may include audio-only portions (e.g., 138) and combined audio-video portions (e.g., 140).

Having received the incoming media 136, which may include the feeds 138 and 140, the service provider system 114 may store the incoming media in the MM server 120. The service provider system 114 may also store, organize, transform, and filter the incoming media for later access. In response to the requests 134 from the user 132, the MM server 120 may deliver the filtered multimedia content (denoted at 142) to the device 128 of the user by way of the content retriever engine 122 of the multimedia server 120. The simulcasting bridge 116 and network interface 118 of the service provider may include a voice over internet protocol bridge (VoIP) or a network implemented by adapting conventional voice-bridging technology with VoIP routers and voice servers. VoIP is known in the art and therefore additional description of this technology is not included.

Storage in the Multimedia Server 120 may also include other extended media, such as, for example, media generally described in the industry as XML. This extended media content may be delivered via the simulcasting bridge 116 and network interface 118 of the service provider as multimedia content 142, or the extended media content may be routed off the network interface 118 onto the public Internet or onto a private intranet for delivery to an electronic retrieval system 146 for storage outside of the Service Provider 114.

The user 132 may request information relating to a variety of different subjects 102 via the device 128. These different subject(s) 102 can include a plurality of different areas of interest. The subject(s) 102 requested may be specific to a particular site or event where the user is located, and can include sporting events, such as football games, baseball games, basketball games, golf tournaments, tennis matches, swimming meets, bowling tournaments, NASCAR® races, or any number of other sporting events. The site can also include an indoor or outdoor shopping mall, a strip mall, other commercial businesses, or a city, street, or neighborhood where further information about the area or setting is desired. The subject(s) 102 requested may include a specific car or driver at a NASCAR® race, a specific player on a team, a team in general, the ballpark, raceway, or site where an event is taking place, the history of the particular sporting event being played, past statistics of a team or player, the address of a business, the weather at a specific location, live traffic reports, a specific location when lost, and a number of additional subjects which relate to the event or setting at the particular location where the access number is entered via the device 128.

The subject(s) 102 requested may be specific to the particular site or event where the user is located by way of the geographic location component 126 associated with the server tower 124 of the device 128 of the user. The service provider 114 may provide position tracking by geographic location components 126 to comply with Federal Communications Commission (FCC) mandates relating to tracking the locations of 911 calls made from mobile devices. Service providers 114 utilize a plurality of technologies, such as, for example, TruePosition®, to accurately determine locations of the devices 128 after the user has made a call. Because the service provider uses these positioning technologies, requests (e.g., 134) relating to particular subjects 102 can be specific to a particular event or location. A request entered via the device 128 pertaining to a specific subject 102 selected from all possible subjects by identification with a dialed number may automatically retrieve the correct subject at the correct location or event, because the location or event is known by the service provider system 114 via the dialed number and the geographic location component 126. For example, the service provider system 114 may identify the server tower 124 through which the device 128 is communicating and select the appropriate initial message queue based upon the dialed number.

Further, in some implementations, by using the global positioning system 130 (GPS), the system 100 may more accurately establish the location of the device 128 and the user 132. Additionally, the system 100 may fulfill detailed location-specific requests 134 from the users, relating to particular subjects 102. Use of a device 128 equipped with a GPS 130 may be particularly helpful when the request 134 involves an exact location for a user 132 who is walking or driving about and becomes lost, or when the geographic location component 126 associated with the server tower 124 cannot provide a precise location of a requested structure or business. For example, this situation may arise when a user enters a request 134 for the location of a particular mall, and upon arrival to the correct street, malls are present on both sides of the street. The additional use of GPS by the system 100 may aid in identifying which side of the street the requested mall is located.

The multimedia server 120 of the service provider system 114 may receive a plurality of incoming live content 104 media in video, audio, media clip, and text messaging formats. This live content 104 can include live audio broadcasts 138 or video broadcasts 140 in the form of separate radio and television broadcasts (e.g., 110A and 112A), as shown in FIG. 1. This demonstration of separate incoming audio 138 and video 140 broadcasts is for illustration only, as the incoming live content 104 may also consist of combined audio and video broadcasts, at 138 and 140, respectively. For example, the incoming audio feeds 138 or video feeds 140 may include the comments of a golf or tennis player, a specific player on a team, the coach of a team, the crew at the sidelines of a game, a NASCAR® driver, a particular NASCAR® driver's pit crew, a correspondence between the NASCAR® driver and the crew, announcers at sporting events, and numerous additional streams of live content 104. A live audio broadcast 138 or a live video broadcast 140, if selected as the desired subject 102 by the user, can be viewed in real-time with the radio and television broadcasts (e.g., 110A and 112A) listened to or viewed by people not present at the actual sporting event or site. In this manner, a user with a device 128 who may access the system 100 may listen to or watch live audio broadcasts 138 or video broadcasts 140 of a sporting event or information related to the sporting event, while the user is present at the actual sporting event or site where the related information is requested.

The multimedia server 120 of the service provider system 114 may also receive requests 134 for information relating to one or more subjects 102 via the device 128 of the user by way of the network interface 118 and simulcasting bridge 116. The multimedia server 120 may send these requests to the information retriever engine 122 of the multimedia server 120. In turn, the information retriever engine 122 may access the requested information and deliver it to the device 128 of the user via the network interface 118, or the information retriever engine 122 may alternately deliver the requested information to an electronic retrieval system 146 across the network interface 118 via a variety of communication protocols, such as the public Internet or a private intranet. The requested subject 102 information can be delivered in the form of a video stream, audio stream, text message, HTML or XML, picture, graphic, or map. The user may specify preferences for delivery format via the device 128, or the system 100 may select the delivery format based on the capabilities of the receiving device 128 in use or an electronic retrieval system 146.

Figure 2:
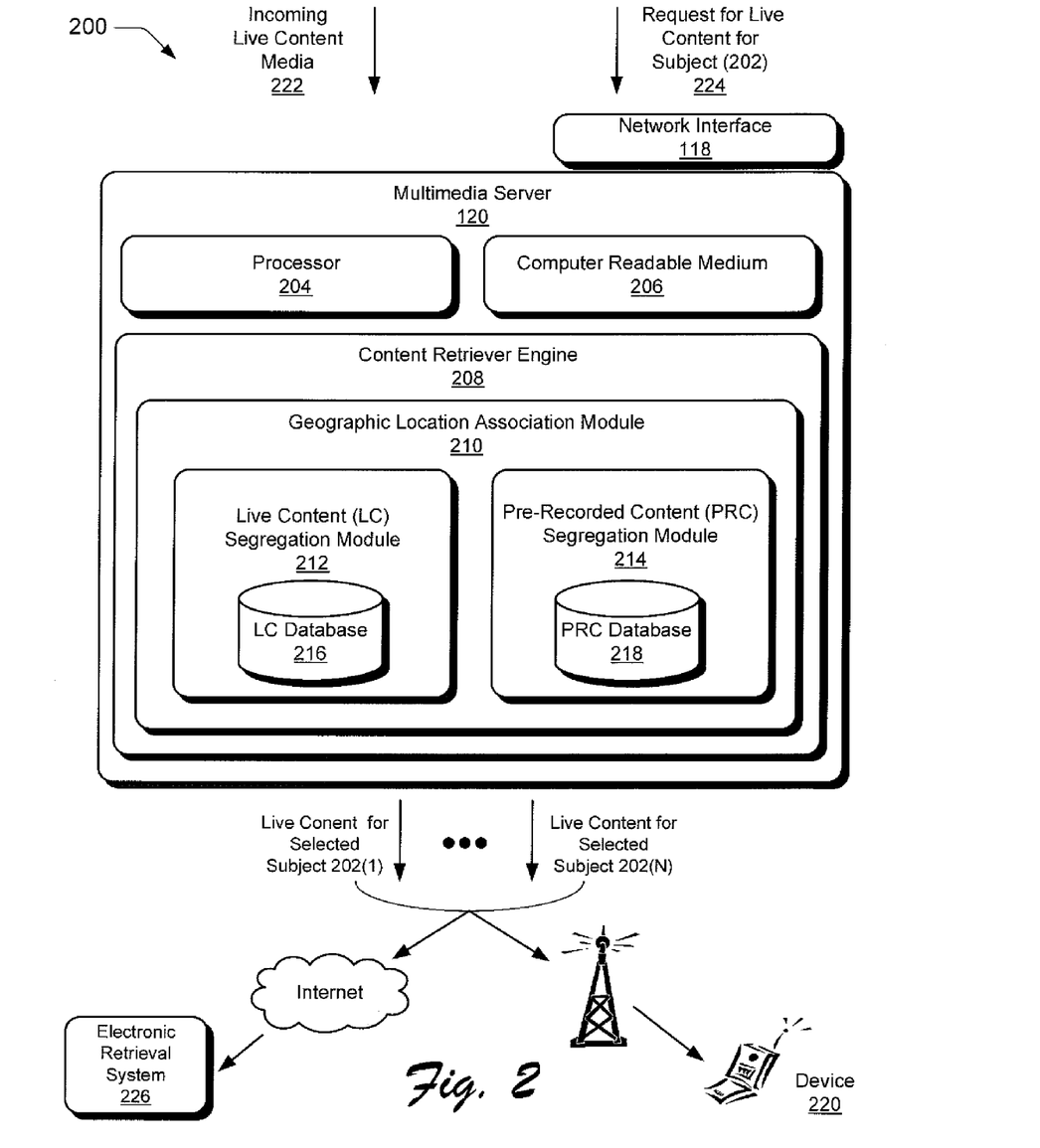
FIG. 2 is a block diagram illustrating the request and receipt of live content in which embodiment(s) of interactive inquiry and access to information via cellular networks can be implemented.

FIG. 2 illustrates an exemplary service provider system 200 in which embodiments of interactive inquiry and access to information via cellular networks can be implemented. The illustrated configuration of the service provider system 200 is only one example arrangement. Other arrangements of the illustrated components are possible within the scope of the subject matter. The exemplary service provider system 200 may operate with a network interface 118, a multimedia server 120, a processor 204, a computer readable medium 206, an information retriever engine 208, a geographic location association module 210, a live content segregation module 212, a pre-recorded content organization module 214, a live content (LC) database 216, a pre-recorded content (PRC) database 218, a device 220, and an electronic retrieval system 226.

In the exemplary service provider system 200, the multimedia server 120 may receive incoming live content (denoted at 222) pertaining to a plurality of different subjects, in separate audio or video form or in combined audio/video media format, as described in FIG. 1. As the system 200 receives the incoming live content, the live content segregation module 212 may separate the live content into respective live streams relevant to the different subjects. The separated live streams of different subject information may be stored in the live content database 216, where the content retriever engine 208 accesses specific live content when requested by a user utilizing a device 220. The live content can be retrieved by the content retriever engine 208 according to preferences specified previously by the user.

The geographic location association module 210 may link the incoming live content received by the multimedia server 120 and stored in the live content database 216 to a geographic location, event, or site. The service provider system 200 may enable a user to gain admission to the system by entering a specified access number via the device 220. This access number may be received and validated by the multimedia server 120 via the network interface 118. The access number may be provided to the user of the device 220, and may be a number provided solely for use in one type of event, such as an NFL® football game, an NBA® basketball game, or a NASCAR® race, or for one type of locale, such as a shopping mall, business, or other site of interest. The access number may also be an electronic serial number (ESN) of the device itself. An ESN is a unique identification number embedded or inscribed on the microchip of a device by the manufacturer. A service provider may associate the user and the user account with the ESN of the device. In the exemplary service provider system 200, the access number provided to users may be the same number provided for all NFL® football games across the country, where all users of the system 200, at each NFL® game site on a given day, may use the same access number. Although the access number may be the same for all locations, subsequent subject requests made by users in differing locations may result in content retrieval related to the specific NFL® game an individual user is attending. This automatic association of a device 220 with a location may be accomplished by the geographic association module 210, which may locate the position of the device 220 at the time of user access number entry.

The geographic location association module 210 links a device 220 with a specific location via the geographic location component associated with the server tower of the device 220 of the user. As described in FIG. 1, the geographic location component of the service provider system 200 may utilize a plurality of positioning technologies, such as TruePosition®, to accurately determine locations of the devices 220 once a call has been placed. In embodiments of interactive inquiry and access to information via cellular networks, using a global positioning system (UPS) may more accurately establish the location of the device 220 and may also aid in responses to users regarding subject information requests 224. When additional positioning information is needed to automate a selection or to provide an appropriate response, the exemplary service provider system 200 may enable the user to enter a voice or keypad response queue, whereby the user may enter additional information required for an accurate response via the device 220.

A request 224 for live content may be received by the multimedia server 120 via the network interface 118 and may be subsequently sent to the content retriever engine 206 in order to access the requested content. This access by the content retriever engine 206 may be implemented as computer executable instructions contained on a computer readable medium 206, which may be read and executed by processor(s) 204 for the implementation of embodiments of interactive inquiry and access to information via cellular networks. The content retrieval engine 208 may locate the requested live content in the live content database 216 and may deliver this information, relevant to the event or site attended by the user, to the device 220 of the user or an electronic retrieval system 226 connected to the system 200 via appropriate communication protocols.

Figure 3:
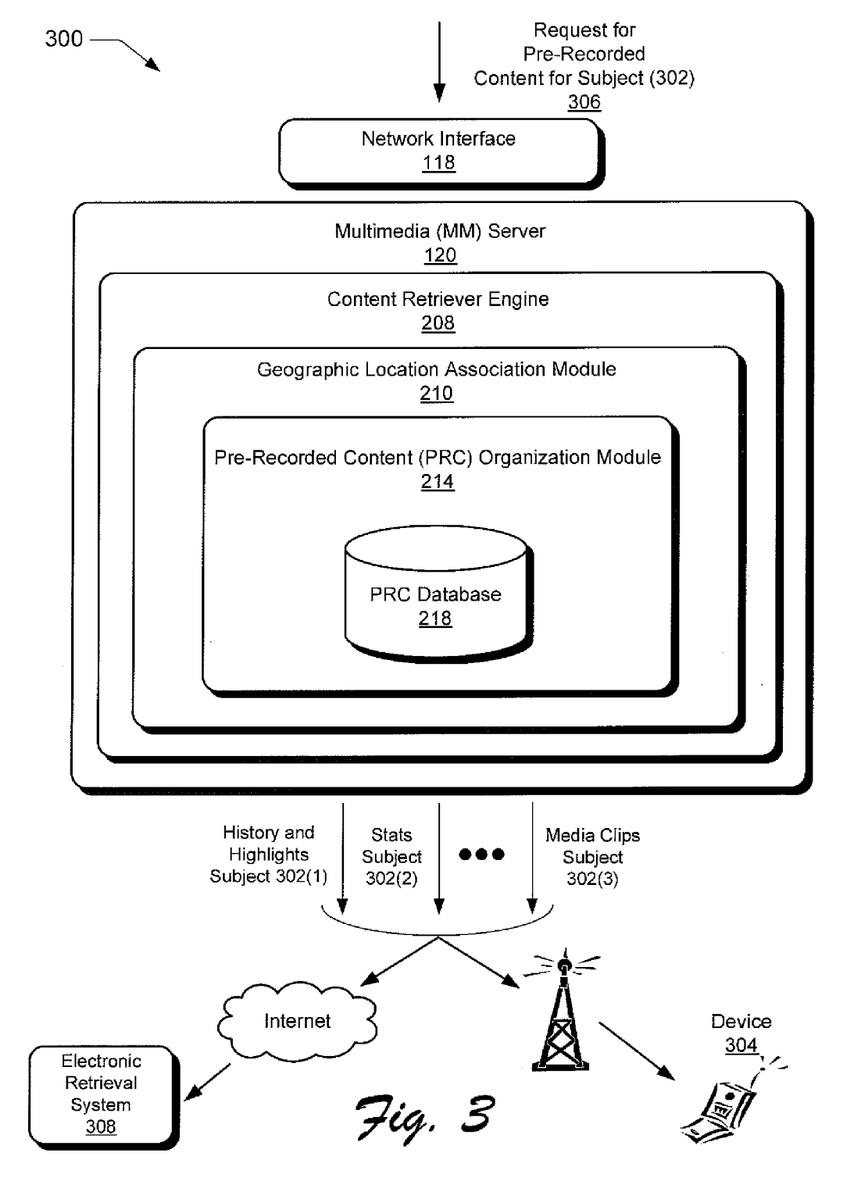
FIG. 3 is a block diagram illustrating the request and receipt of pre-recorded content in which embodiment(s) of interactive inquiry and access to information via cellular networks can be implemented.

FIG. 3 illustrates an exemplary service provider system 300 in which embodiments of access and interactive inquiry to information via cellular networks may be implemented. The illustrated configuration of the service provider system 300 is one example arrangement demonstrating a request for and retrieval of pre-recorded content from a multimedia server 120. Other arrangements of the illustrated components in an exemplary service provider system 300 are possible within the scope of the subject matter. The exemplary service provider system 300 may operate with a network interface 118, a multimedia server 120, a content retriever engine 208, a geographic location association module 210, a pre-recorded organization module 214, a pre-recorded content database 216, a device 304, and an electronic retrieval system 308.

The exemplary service provider system 300 may enable users to gain admission into the system 300 by entering a specified access number via a device 304. The entered access number may be received by the multimedia server 120 via the network interface 118. The system 300 may also enable users to request pre-recorded subject 302 content specific to a particular location or event via the device 304, and this request may be received by the multimedia server 120 via the network interface 118. The pre-recorded content may be organized according to subject by the pre-recorded content organization module 214 and may be stored in the pre-recorded content database 218. Requests for pre-recorded content 306 may include a plurality of areas of interest pertaining to specific events or sites attended by users. For example, pre-recorded content may include the history of a particular sporting event, the history of a certain player on a team, a coaching history of a team's coach, past statistics of a team or player, media clips of past plays by a particular player, the address of a business, the weather at a particular location, a specific location when lost, sales in particular stores at a shopping mall, and additional subjects that may be recorded and replayed to a user upon request via the device 304.

Following receipt of the request for pre-recorded content 306, the multimedia server 120 may send the request to the content retriever engine 208. The content retriever engine 208 may locate the appropriate information from the pre-recorded content database 218. The geographic location association module 210 may apply positioning technology to ensure that the retrieved information is relevant to the location of the user requesting the content. The positioning technology may determine the accurate position of the device 304 when the user enters the access number. As a result, content requests 306 by the user may be linked to the established location of the device 304. The content retriever engine 208 may subsequently deliver the requested content to the device 304 of the user or to an electronic retrieval system 308.

For example, a user is attending an NFL® football game and would like to learn more about the history of his favorite team playing in the game that day, the New York Giants®. The user may be enabled to gain access to the service provider system 300 by entering the provided access number. Once access to the system 300 is achieved, a content request 306 may be received following user entry of a set of numbers via the device 304. The entered numbers correspond to the subject 302(1) of the history of the Giants football team. Accordingly, the user may be enabled to listen to pre-recorded content regarding the history of the Giants football team via the device 304, where the content may be retrieved from the pre-recorded content database 218 by the content retriever engine 208.

Figure 4:
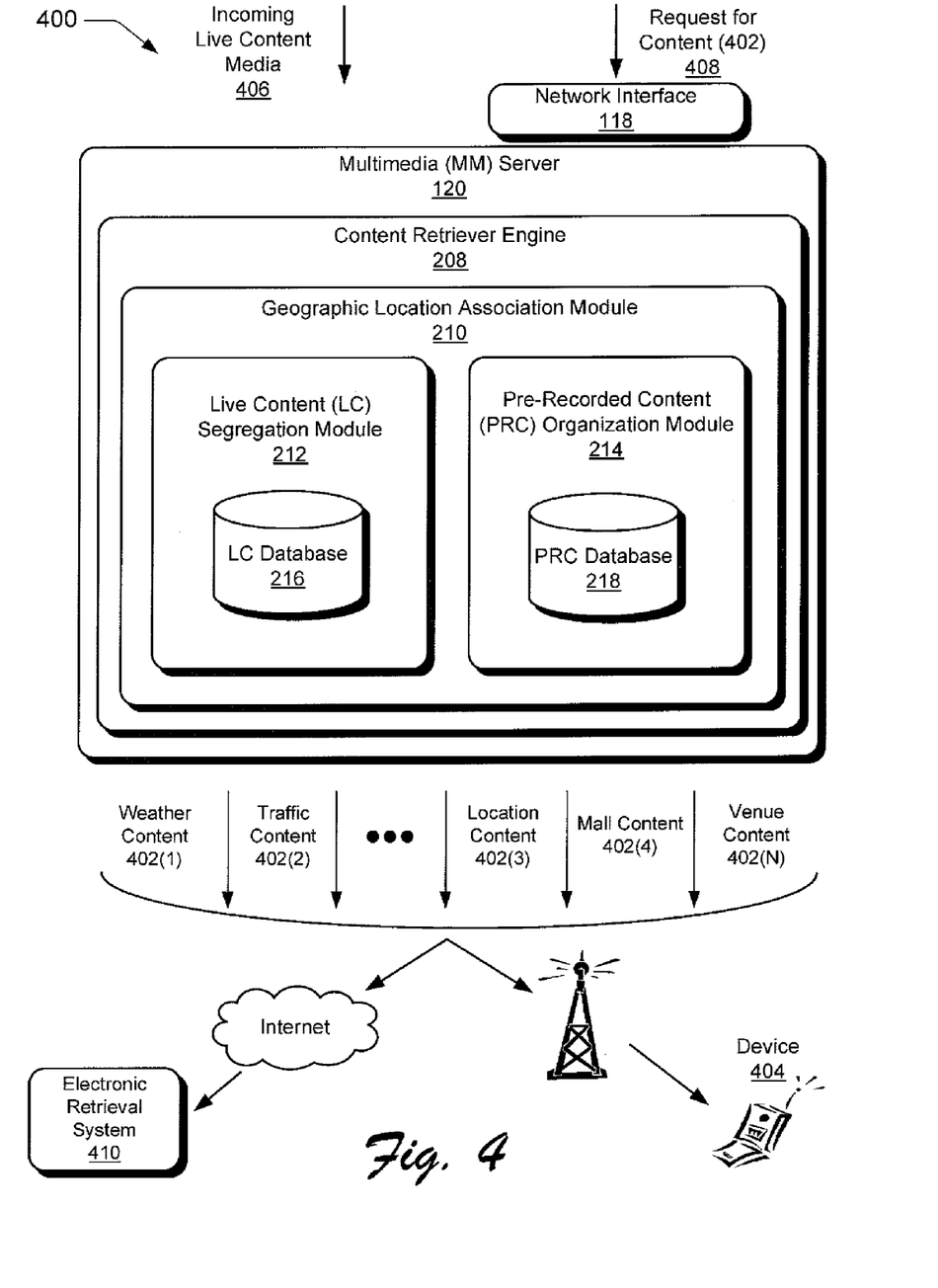
FIG. 4 is a block diagram illustrating the request of live and pre-recorded content in which embodiment(s) of interactive inquiry and access to information via cellular networks can be implemented.

FIG. 4 illustrates an exemplary service provider system 400 in which embodiments of interactive inquiry and access to information via cellular networks may be implemented. The illustrated configuration of the service provider system 400 is only one example arrangement. Other arrangements of the illustrated components are possible within the scope of the subject matter. The exemplary service provider system 400 may operate with a network interface 118, a multimedia server 120, a content retriever engine 208, a geographic location association module 210, a live content segregation module 212, a pre-recorded content organization module 214, a live content (LC) database 216, a pre-recorded content (PRC) database 218, a device 404, and an electronic retrieval system 410.

The system 400 may enable a user to gain access by entering a provided access number via a device 404. The access number may be received by the multimedia server 120 via the network interface 118. The multimedia server 120 may also receive incoming live content 406 in audio, video, combined audio/video, or text format. In an embodiment of interactive inquiry and access to information via cellular networks, a user may be interested in acquiring information about a subject (depicted as 402) at an attended event or location that involves the retrieval of both live content and pre-recorded content. In this example, a request 408 for content about a subject that includes both live and pre-recorded content may involve the retrieval of information from both the live content database 216 and pre-recorded content database 218.

The multimedia server 120 may receive user requests 408 via the device 404 and the network interface 118, and may send the requested information to the content retrieval engine 208. For those aspects of the content requests 408 that include live content broadcasts or media clips, the content retriever engine 208 may locate the live content in the live content database 216 of the live content segregation module 212. This live content may then be delivered to users via the device 404. For those aspects of the content request 408 that include pre-recorded content such as statistics, histories, trends, and media clips, to name a few of the many requests possible, the content retrieval engine 208 locates the correct content in the pre-recorded content database 218 of the pre-recorded content organization module 214. This requested pre-recorded content may then be delivered to the user via the device 404 or the content may be delivered to the electronic retrieval system 410 for extended access. The retrieval of live and pre-recorded content may be relevant to location of devices 404 as a result of the application of positioning technologies by the geographic location association module 210.

For example, a user may arrive at a vacation destination and would like information regarding the current and past weather for that destination. The user may be enabled to access the service provider system 400 by device 404 entry of the provided access number. Once the user achieves access to the system 400, a request 408 for a current weather report may be received. The request 408 may be received by the multimedia server 120 and sent to the content retrieval engine 208. If a request for live content is received by the system 400, such as a request for a Weather Channel® broadcast, the information may be located by the content retrieval engine 208 in the live content database 216. The information may then be delivered to the device 404 as a live broadcast 402(1) of the current weather conditions for the vacation destination. If a request for the local weather conditions in July for the past ten years is received by the system 400, the request may be sent to the content retrieval engine 208, which locates the information in the pre-recorded content database 218. This content 402(1) may then be delivered to the user via the device 404, or it may be delivered to the electronic retrieval system 410 where the user may access the content 402(1), for example, via electronic mail.

The same or similar application of the system 400 as described previously can be applied to requests 408 made for the non-limiting examples demonstrated in FIG. 4, including traffic content 402(2), location content 402(3), mall content 402(4), and venue content 402(N). These examples involve subjects that may include content stored in both the live content database 216 and the pre-recorded content database 218, depending on the exact nature of the requested information. If the content is updated periodically and then stored, this content would be stored in the pre-recorded database 218. Information received by the multimedia server 120, segregated by the live content segregation module 212, and maintained in the live content database 214, may be accessible as live content in real-time.

Methods for interactive inquiry and access to information via cellular networks, such as methods 500 and 600 described with reference to respective FIGS. 5 and 6, may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment computer executable instructions may be located in both local and remote computer storage media, including memory storage devices.

Figure 5:
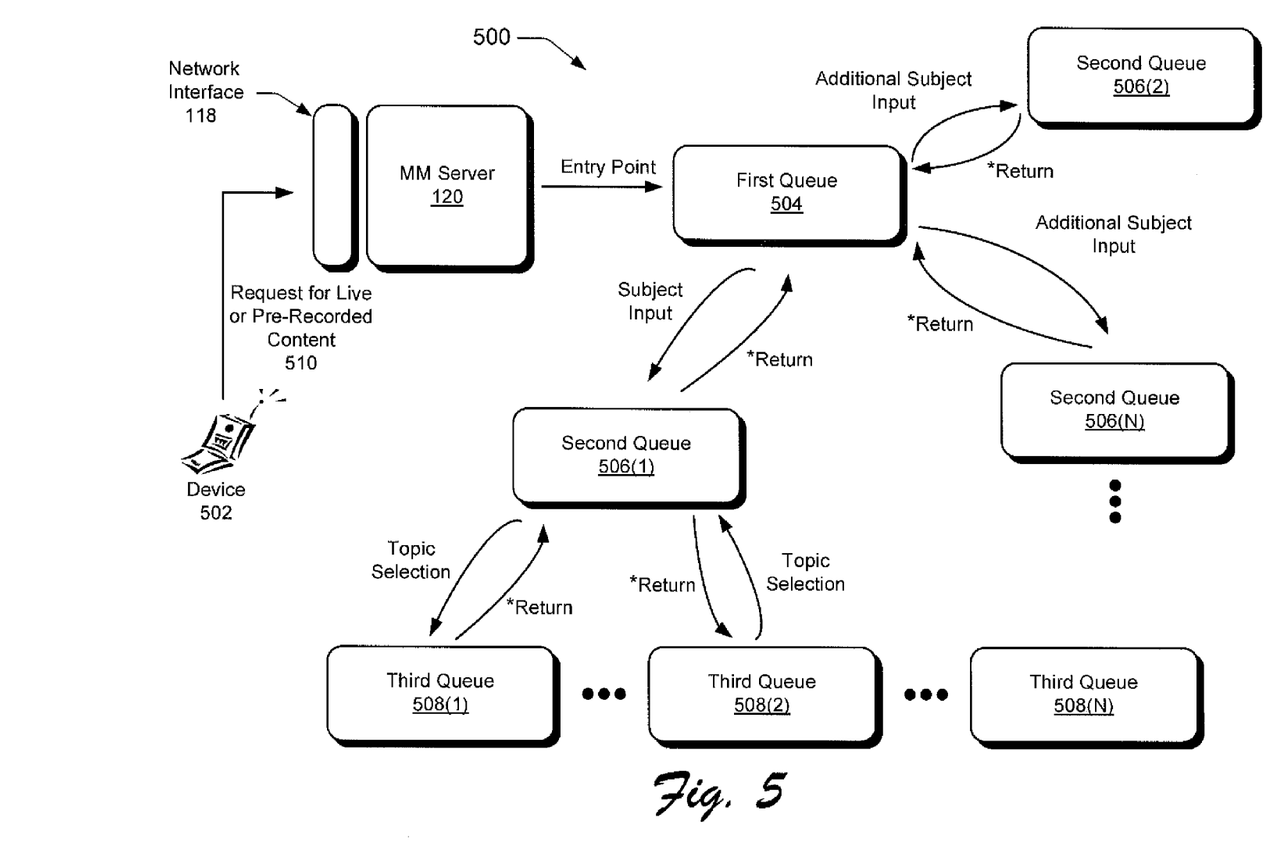
FIG. 5 is a diagram illustrating an exemplary method utilizing a queue system in which embodiments of interactive inquiry and access to information via cellular networks can be implemented.

FIG. 5 illustrates an exemplary method 500 utilizing a nested queue system for accomplishing interactive inquiry and access to information via cellular networks. The order in which the method is described is not intended to be construed as a limitation. The method can be implemented in any suitable hardware, software, firmware, or combination thereof.

In exemplary method 500, access to a multimedia server 120 of a service provider may be enabled when a number entered into a device 502 by a user is received via the network interface 118. The number received may be an access number provided by the service provider, proprietor of the event or locale, or a combination of both, to enable users to acquire information related to an event or locale. In another embodiment, the number received may be a number associated with an event or locale, registered as a Uniform Resource Locator (URL). A web-enabled device 502 may be able to access a web page in an electronic retrieval system, which enables a user to employ the exemplary method 500 via the internet. For example, The Met Theatre in Ft. Wayne, Ind. may have the URL www.mettheatre.org and also have the toll-free telephone number 1-800-278-5555. For this example, connecting a device 502 configured with a browser to www.8002785555.org may provide a web-page equivalent of the exemplary queue method 500.

Once access to the service provider is achieved, the user may be enabled to enter a first queue 504. The first queue 504 entered may be different from one user to another. In some embodiments, the system may require additional information from a user, and may enable the user to enter a dialogue queue where the user may respond to system inquiries regarding the device 502 in use or regarding user preferences for system use. Additionally, an error queue may be provided by the system which may interact with the user when error conditions are received by any queue of the system. In exemplary method 550, upon user entry into the first queue 504, a broadcast may be transmitted to the user via the device 502 in one of audio, video, or text format. The broadcast may be delivered to the device 502 via the network interface 118, and may consist of either live transmissions or pre-recorded transmissions.

The network interface 118 may receive a specific key entry via a device 502 that may generate a dual tone multi-frequency (DTMF), enabling the user entering the specific key entry via the device 502 to exit the first queue 504 and enter a second queue 506. The specific key entry provided via the device 502 may be a request 510 for a subject that may be described in the live or pre-recorded broadcast transmission.

The specific key entry may correspond to the subject requested 510 by the user, and may contain a number or letter entry, a combination number and letter entry, a text entry, or a voice entry. The subject(s) requested may be specific to the particular event or locale the user is attending, which may include a sporting event, such as a football game, baseball game, basketball game, golf tournament, tennis match, swimming meet, bowling tournament, a NASCAR® race, or a number of other sporting events. The locale may also include an indoor or outdoor shopping mall, a strip mall, other commercial businesses, or a city, street, or neighborhood where further information about the area or setting is desired. The subject(s) requested 510 may include a specific car or driver at a NASCAR® race, a specific player on a team, a team in general, the ballpark, raceway, or site where an event is taking place, the history of the particular sporting event being played, past statistics of a team or player, the address of a business, the weather at a specific location, a specific location when lost, and a number of additional subjects which relate to the event or setting at the particular location where the access number is entered via the device 502. This list of subjects is only an example of the many possible subjects that may be selected by a user, and does not limit the possible subjects that may be selected by a user via a device.

A user may be enabled to enter the second queue 506 following receipt of the specific entry for the requested subject by the system 500. The second queue 506 may contain a range of topics of information related to the previously selected subject. User selection for the desired topic, which may contain a number or letter entry, a combination number and letter entry, a text entry, or a voice entry, may be received by the system 500 via the device 502. The range of topics in the second queue 506 may include detailed information about the specific subject previously selected by the user via the device 502. This facilitated movement from one queue to a higher (in described number) queue, where the higher queue contains additionally detailed information, enables users to access a variety of information regarding subjects of interest.

For example, a user subject selection for a particular NASCAR® driver may be received. Topics that may be offered in the second queue 506 relating to this NASCAR® driver selection may include in-car camera views of the driver, audio conversations between the driver and his pit crew, the statistics of the driver's career, media clips of the driver in past races, and the personal history of the driver. This provided list of topics only provides examples of the many possible topics that may be selected by a user after selecting a specific subject, such as a NASCAR® driver. This example does not limit the possible topics that may be available in the interactive inquiry and access process.

Following receipt of the topic of information selection via the device 502, the user may specify a desired delivery format to the device 502 for that topic, or the system 500 may select a delivery format based on the capabilities of the receiving device 502 in use. The service provider supplying the service to the device 502 may allow or block particular forms of delivery, according to the possessed subscription service of the device 502. The media format for delivery of the topic of information may include a video stream, audio stream, text message, picture, or map. An audio, text, or video prompt offered in the second queue, following the topic of information selection, may provide the appropriate device 502 entries for the corresponding delivery media format. The successful selection of a topic of information and a desired media format enables the user to enter a third queue 508(1), where the topic of information may be delivered to the device 502 in the requested media format.

Once the user is finished listening or viewing the requested topic of information, the user may be enabled to return to the second queue 506 via a predetermined device 502 key entry. A return to the second queue 506 may enable the user to select a different topic of information for the selected subject. A predetermined key entry, which may be provided to the user of the device 502 at the end of the topic of information run, or at any point after achieving access to the service provider system, may be received via device 502 entry for return to the second queue 506. An example of a predetermined key entry, as demonstrated in FIG. 5, may include the * key on the device 502, but may include any single key or combination of keys as predetermined for a successful return to a previous queue.

Upon return to the second queue 506, a different topic of information selection may be received from the range of available topics of information related to the previously selected subject. Following selection receipt, a preferred media delivery format for the selected different topic of information is received by the system 500. For this preference, the user may be prompted to either stay with the previously selected media delivery choice or to select a new media format for delivery. If a new media format is desired by the user, an appropriate device 502 entry for this new choice may be received. The different topic of information and delivery format selections enable the user to again enter a third queue 508(2), where the topic of information may be delivered to the device 502 of the user in the preferred media format. This sequence of the system 500, including enabling a user to return to the second queue 506 via a predetermined key device 502 entry, receiving selections for a different topic of information and preferred format for delivery, and delivering, in the third queue 508(N), the different topic of information to the device 502, may repeat in as many or few sequences as desired, until the range of topics of information offered in the second queue 506 for a particular subject have been exhausted.

A user may also be enabled to return to the first queue 504 via predetermined device 502 key entry, in order to select an additional subject other than the originally requested subject. This return may occur from the third queue 508 or the second queue 506, and may include the same predetermined key entry for the return. A return from the second queue 506 to the first queue 504 may include receipt of one entry of the * button of the device 502, whereas a return from the third queue 508 to the first queue 504 may include receipt of two entries in immediate succession of the * button of the device 502. Other possible symbols, numbers, or letter entries for return via device 502 entry may be utilized; the * button is only an example of one possible predetermined key entry for return to a previous queue.

Once the user has been enabled to return to the first queue 504, an additional subject selection from those subjects originally depicted in the original live or pre-recorded broadcast transmission may be received. An additional subject may include a different NASCAR® car or driver than previously selected, or may include an entirely different subject, such as the NASCAR® race itself, the raceway where the particular race is being held, or the history of NASCAR® racing. These provided subjects are only examples of the many possible additional subjects that may be selected by a user after returning to the first queue 504. They do not limit the possible subjects that may be available for selection by a user.

Receipt of an additional subject selection by specific key entry via the device 502 enables the user to enter a second queue 506(2), where a range of topics of information related to the selected additional subject may be available. As described previously, selections for a topic of information related to the additional subject and the desired media format for delivery may be received, enabling the user to enter a third queue 508 and receive the selected topic of information via delivery to the device 502. This sequence of the system 500 of enabling a user to return to the first queue 504 via predetermined key device 502 entry, receiving selections for an additional subject, related topics of information, and preferred media format for delivery, and delivery of the topic of information related to the additional subject, may repeat in as many or few sequences as desired until the range of subjects offered in the first queue 504 for a particular event or locale have been exhausted.

Figure 6:
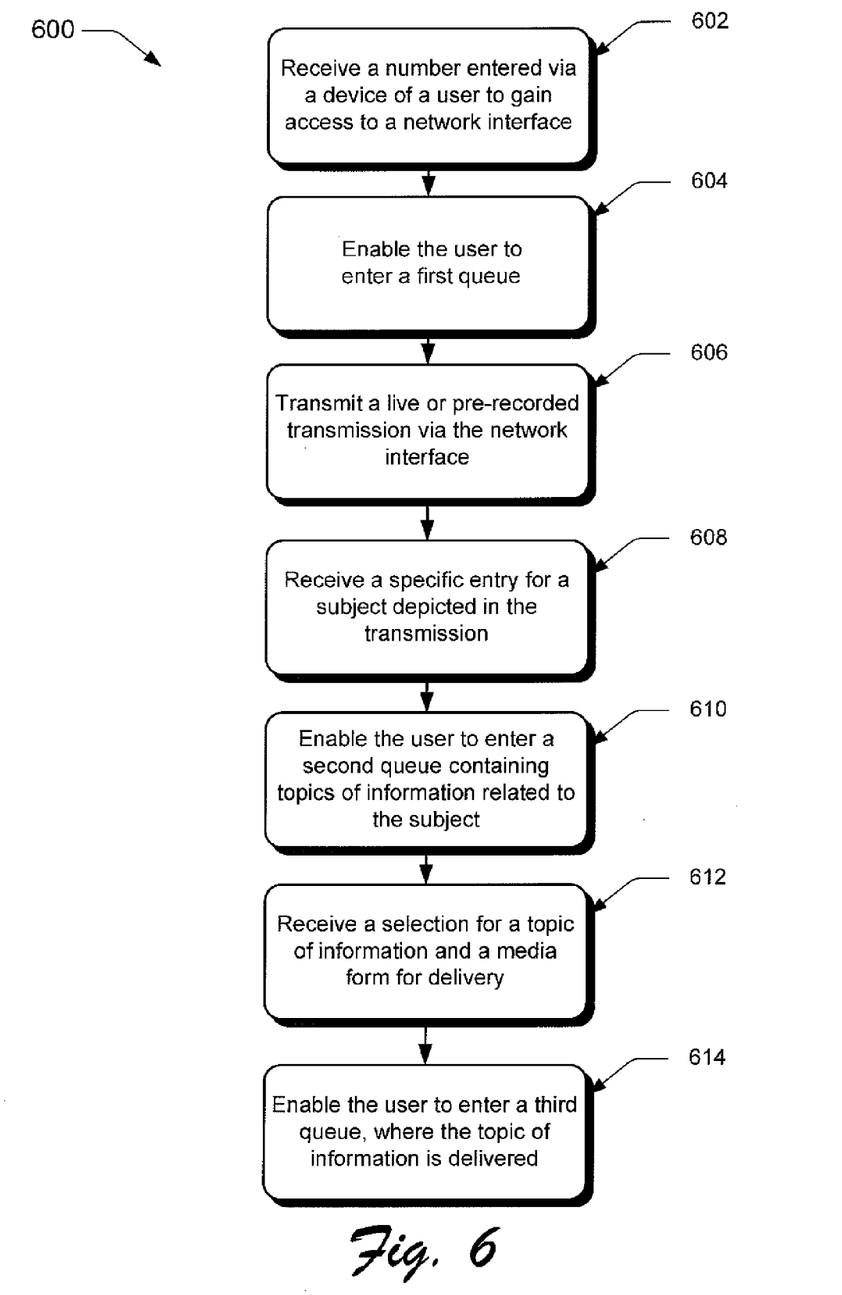
FIG. 6 is a flow diagram illustrating an exemplary method(s) in which embodiments of interactive inquiry and access to information via cellular networks can be implemented.

FIG. 6 illustrates an exemplary method 600 for interactive inquiry and access to information via cellular networks and is described with reference to the service provider system 100 of FIG. 1 and the exemplary method 500 utilizing a nested queue system in FIG. 5. The order in which the method is described is not intended to be construed as a limitation, and any number of the described method blocks can be combined in any order to implement the method, or an alternate method. The method can be implemented in any suitable hardware, software, firmware, or combination thereof.

At block 602, a user is enabled to gain access to the system 100 by entering a provided access number or number URL for web page access, via a device 502 (FIG. 5). For example, a service provider 114 (FIG. 1) or a service provider 114 in conjunction with an event host or business owner, may supply the user with the access number for the event or location attended by the user. Upon entry of the access number via the device 128, the multimedia server 120 of the service provider 114 may receive the number via the network interface 118 and simulcasting bridge 116. The user is enabled to gain access to the network interface 118 and service provider system 100, and at block 604, the user is enabled to enter a first queue 504 (FIG. 5).

At block 606, following enabled entry into the first queue 504 by the user, a live or pre-recorded broadcast may be transmitted to the device 502 via the network interface 118. The live or pre-recorded broadcast to the device 502 of the user may be in one of audio, video, or text format. The broadcast may include information regarding how to use the system and may also provide a directory of subjects available for inquiry by the user, and the appropriate device 502 entry corresponding to a respective subject for selection by the user. For example, a user may be attending an NBA® basketball game. An example directory of subjects at an NBA® basketball game may include the teams playing in the game, the event location, the history of the two teams in games against each other, history of NBA® basketball in general, the current game records of each team, in addition to many other possibilities for subject choices at an NBA® event location.

At block 608, a specific device 502 entry for a subject depicted in the broadcast transmission may be received by the system 500. Continuing on with the above example, the user at the NBA® basketball game may be interested in receiving information about a team playing in the game the user is attending. The device 502 entry corresponding to the team of interest may be entered into the device 128 by the user and received by the network interface 118.

At block 610, the receipt of the device 502 entry corresponding to the desired subject enables the user to enter a second queue 506 containing topics of information related to the selected subject. Continuing on with the NBA® basketball game example, example topics of information available for selection may include specific players on the selected team, the coach of the team, the team's statistics over a number of years, the history of the team, audio feeds of the coach speaking with the team, and many other additional possibilities for topic of information choices. The appropriate device 502 entry corresponding to respective information topics may also be provided to the user in the second queue 506, to enable the user to receive the desired topic of information.

At block 612, a selection for a topic of information and a media format for delivery of the topic of information may be received by the system 500. For example, the user at the NBA® basketball game may be interested in learning more about a specific player on the NBA® team the user previously selected. A device 502 entry corresponding to the particular player may be received by the network interface 118. In addition, a prompt may be provided to the user via the device 502 in order for the user to select the media format for delivery of the selected topic of information. For example, media formats for delivery may include audio, video, and text formats, or pictures and maps, depending on the capability of the device 502 in use and the subscription service enacted for the device 502. The system may transform some delivery formats as necessary to adjust to the capabilities of the device 502 or to transform to the format of a target device or system, such as for electronic mail delivery or for delivery to a printer. In this example, a device 502 entry corresponding to an audio format for delivery of the NBA® player topic information may be received by the system 500.

At block 614, the receipt of the device 502 entry corresponding to the desired topic of information by the system 500 enables the user to enter a third queue 508, where the topic of information may be delivered to the device 502 of the user in the media format previously selected by the user. For example, after the user selects the particular NBA® player and an audio format for delivery to the device 502, the user may be enabled to enter the third queue 508 and receive the selected information in audio form via the device 502.

Although embodiments of interactive inquiry and access to information via cellular networks have been described in language specific to features and/or methods, it is to be understood that the subject of the appended claims is not necessarily limited to the specific features or methods described. Rather, the specific features and methods are disclosed as exemplary implementations of interactive inquiry and access to information via cellular networks.

The invention claimed is:

1. A method, comprising:

receiving, by a system using a processor, a pre-assigned number provided by a user mobile device to gain access to a network interface for obtaining data corresponding to a particular event attended by a user having the user mobile device or a local site visited by the user having the user mobile device, wherein the number is pre-associated with the particular event attended or the local site visited;

allowing, by the system, in response to receiving the pre-assigned number, a first user access, for the user mobile device, to a first queue;

initiating transmitting, via the network interface, to the user mobile device, a transmission, wherein the transmission:

is related to the particular event attended or the local site visited;

includes a depiction of a subject;
corresponds to the pre-assigned number received; and
has a type selected from a group consisting of live and pre-recorded;
receiving, by the system, from the user mobile device, in response to the allowance and the transmitting, a request indicating a subject entry corresponding to the subject depicted in the transmission;
allowing, by the system, in response to receiving the subject entry, a second user access, for the user mobile device, to a second queue containing topics of information related particularly to the subject corresponding to the subject entry;
receiving, by the system, from the user mobile device, in response to providing the second user access, a selection for a selected topic of information, of the topics of information in the second queue;
receiving, by the system, from the user mobile device, a preferred media format for delivering the data corresponding to the selected topic of information;
allowing, by the system, in response to receiving the selected topic of information and the preferred media format, a third user access, for the user mobile device, to a third queue; and
delivering, by the system, in response to the third user access to the third queue, and in the preferred media format, the data, wherein the data corresponds to each of:
the particular event attended or the local site visited;
the subject depicted in the transmission; and
the selected topic of information.

2. The method of claim 1, wherein the network interface comprises a voice over internet protocol bridge supplied by a service provider.

3. The method of claim 1, wherein the transmission comprises at least one type of data selected from a group consisting of audio and text.

4. The method of claim 1, wherein the preferred media format for delivery of the topic of information comprises at least one format selected from a group consisting of video stream, audio stream, text message, picture, map, graphical content, hypertext markup language protocol, and extensible markup language protocol.

5. The method of claim 1, wherein the particular event is an entertainment event at which the user mobile device is located.

6. The method of claim 1, wherein:
the data is first data; and
the method further comprises:
receiving, subsequent to delivering the first data, a first predetermined entry;
allowing, in response to receiving the first predetermined entry, a fourth user access, to the second queue corresponding particularly to the first predetermined entry;
receiving an additional selection, for an additional topic of information, and an additional media format preference for delivery of the additional topic;
allowing, in response to receiving the additional selection and the additional media format preference, a fifth user access, to the third queue corresponding particularly to the additional topic; and
delivering, in response to the fifth user access, in the additional media format, additional data, corresponding to the additional topic.

7. The method of claim 6, further comprising:
receiving a second predetermined entry;
allowing, in response to receiving the second predetermined entry, a sixth user access, to the first queue corresponding particularly to the second predetermined entry;
receiving an other request indicating an other subject entry corresponding to an other subject depicted in the live transmission or the pre-recorded transmission;
allowing, in response to receiving the other subject entry, a seventh user access, to the second queue containing topics of information related specifically to the other subject;
receiving an other selection, for an other topic of information, related to the other subject and a third preferred media format for delivery of the other topic of information related to the other subject;
allowing, in response to receiving the other topic of information and the third preferred media format for delivery of the other topic of information, an eighth user access, to the third queue corresponding particularly to the other selection; and
delivering, in response to the eighth user access, in the third preferred media format, other data corresponding to the other topic.

8. The method of claim 7, wherein the subject entry and at least one of the predetermined entries comprise an entry selected from a group consisting of: a number key entry, a letter key entry, a combined number and letter key entry, a touchscreen entry, a cursor click entry, and a voice entry.

9. The method of claim 1, wherein the subject comprises at least one type of data selected from a group consisting of: sports information, weather information, traffic information, geographical location information, shopping mall information, and store information.

10. A system, comprising:
a processor; and
a computer-readable storage device comprising instructions that, when executed by the processor, cause the processor to perform operations comprising:
receiving a pre-assigned number provided by a user mobile device to gain access to a network interface for obtaining data corresponding to a particular event attended by a user having the user mobile device or a local site visited by the user having the user mobile device, wherein the number is pre-associated with the particular event attended or the local site visited;
allowing, in response to receiving the pre-assigned number, a first user access, for the user mobile device, to a first queue;
initiating transmitting, via the network interface, to the user mobile device, a transmission, wherein the transmission:
is related to the particular event attended or the local site visited;
includes a depiction of a subject;
corresponds to the pre-assigned number received; and
has a type selected from a group consisting of live and pre-recorded;
receiving, from the user mobile device, in response to the allowance and the transmitting, a request indicating a subject entry corresponding to the subject depicted in the transmission;
allowing, in response to receiving the subject entry, a second user access, for the user mobile device, to a second queue containing topics of information related particularly to the subject corresponding to the subject entry;

receiving, from the user mobile device, in response to providing the second user access, a selection for a selected topic of information, of the topics of information in the second queue;

receiving, from the user mobile device, a preferred media format for delivering the data corresponding to the selected topic of information;

allowing, in response to receiving the selected topic of information and the preferred media format, a third user access, for the user mobile device, to a third queue; and delivering, in response to the third user access to the third queue, and in the preferred media format, the data, wherein the data corresponds to each of:
the particular event attended or the local site visited;
the subject depicted in the transmission; and
the selected topic of information.

11. The system of claim 10, wherein the network interface comprises a voice over internet protocol bridge supplied by a service provider.

12. The system of claim 10, wherein the preferred media format for delivery of the topic of information comprises at least one format selected from a group consisting of video stream, audio stream, text message, picture, map, graphical content, hypertext markup language protocol, and extensible markup language protocol.

13. The system of claim 10, wherein:
the data is first data; and
the operations further comprise:
receiving, subsequent to delivering the first data, a first predetermined entry;
allowing, in response to receiving the first predetermined entry, a fourth user access, to the second queue corresponding particularly to the first predetermined entry;
receiving an additional selection, for an additional topic of information, and an additional media format preference for delivery of the additional topic;
allowing, in response to receiving the additional selection and the additional media format preference, a fifth user access, to the third queue corresponding particularly to the additional topic; and
delivering, in response to the fifth user access, in the additional media format, additional data, corresponding to the additional topic.

14. The system of claim 13, further comprising:
receiving a second predetermined entry;
allowing, in response to receiving the second predetermined entry, a sixth user access, to the first queue corresponding particularly to the second predetermined entry;
receiving an other request indicating an other subject entry corresponding to an other subject depicted in the live transmission or the pre-recorded transmission;
allowing, in response to receiving the other subject entry, a seventh user access, to the second queue containing topics of information related specifically to the other subject;
receiving an other selection, for an other topic of information, related to the other subject and a third preferred media format for delivery of the other topic of information related to the other subject;
allowing, in response to receiving the other topic of information and the third preferred media format for delivery of the other topic of information, an eighth user access, to the third queue corresponding particularly to the other selection; and delivering, in response to the eighth user access, in the third preferred media format, other data corresponding to the other topic.

15. The system of claim 14, wherein the subject entry and at least one of the predetermined entries comprise an entry selected from a group consisting of: a number key entry, a letter key entry, a combined number and letter key entry, a touchscreen entry, a cursor click entry, and a voice entry.

16. The system of claim 10, wherein the subject comprises at least one type of data selected from a group consisting of: sports information, weather information, traffic information, geographical location information, shopping mall information, and store information.

17. A computer-readable storage device comprising instructions that, when executed by the processor, cause a processor to perform operations comprising:

receiving a pre-assigned number provided by a user mobile device to gain access to a network interface for obtaining data corresponding to a particular event attended by a user having the user mobile device or a local site visited by the user having the user mobile device, wherein the number is pre-associated with the particular event attended or the local site visited;

allowing, in response to receiving the pre-assigned number, a first user access, for the user mobile device, to a first queue;

initiating transmitting, via the network interface, to the user mobile device, a transmission, wherein the transmission:
is related to the particular event attended or the local site visited;
includes a depiction of a subject;
corresponds to the pre-assigned number received; and
has a type selected from a group consisting of live and pre-recorded;

receiving, from the user mobile device, in response to the allowance and the transmitting, a request indicating a subject entry corresponding to the subject depicted in the transmission;

allowing, in response to receiving the subject entry, a second user access, for the user mobile device, to a second queue containing topics of information related particularly to the subject corresponding to the subject entry;

receiving, from the user mobile device, in response to providing the second user access, a selection for a selected topic of information, of the topics of information in the second queue;

receiving, from the user mobile device, a preferred media format for delivering the data corresponding to the selected topic of information;

allowing, in response to receiving the selected topic of information and the preferred media format, a third user access, for the user mobile device, to a third queue; and delivering, in response to the third user access to the third queue, and in the preferred media format, the data, wherein the data corresponds to each of:
the particular event attended or the local site visited;
the subject depicted in the transmission; and
the selected topic of information.

18. The computer-readable storage device of claim 17, wherein:
the data is first data; and
the operations further comprise:

receiving, subsequent to delivering the first data, a first predetermined entry;

allowing, in response to receiving the first predetermined entry, a fourth user access, to the second queue corresponding particularly to the first predetermined entry;

receiving an additional selection, for an additional topic of information, and an additional media format preference for delivery of the additional topic;

allowing, in response to receiving the additional selection and the additional media format preference, a fifth user access, to the third queue corresponding particularly to the additional topic; and delivering, in response to the fifth user access, in the additional media format, additional data, corresponding to the additional topic.

19. The computer-readable storage device of claim 18, wherein the operations further comprise:

receiving a second predetermined entry;

allowing, in response to receiving the second predetermined entry, a sixth user access, to a first queue corresponding particularly to the second predetermined entry;

receiving the other request indicating an other subject entry corresponding to an other subject depicted in the live transmission or the pre-recorded transmission;

allowing, in response to receiving the other subject entry, a seventh user access, to the second queue containing topics of information related specifically to the other subject;

receiving an other selection, for an other topic of information, related to the other subject and a third preferred media format for delivery of the other topic of information related to the other subject;

allowing, in response to receiving the other topic of information and the third preferred media format for delivery of the other topic of information, an eighth user access, to the third queue corresponding particularly to the other selection; and delivering, in response to the eighth user access, in the third preferred media format, other data corresponding to the other topic.

20. The computer-readable storage device of claim 19, wherein the subject entry and at least one of the predetermined entries comprise an entry selected from a group consisting of: a number key entry, a letter key entry, a combined number and letter key entry, a touchscreen entry, a cursor click entry, and a voice entry.

* * * * *